Patented July 4, 1939

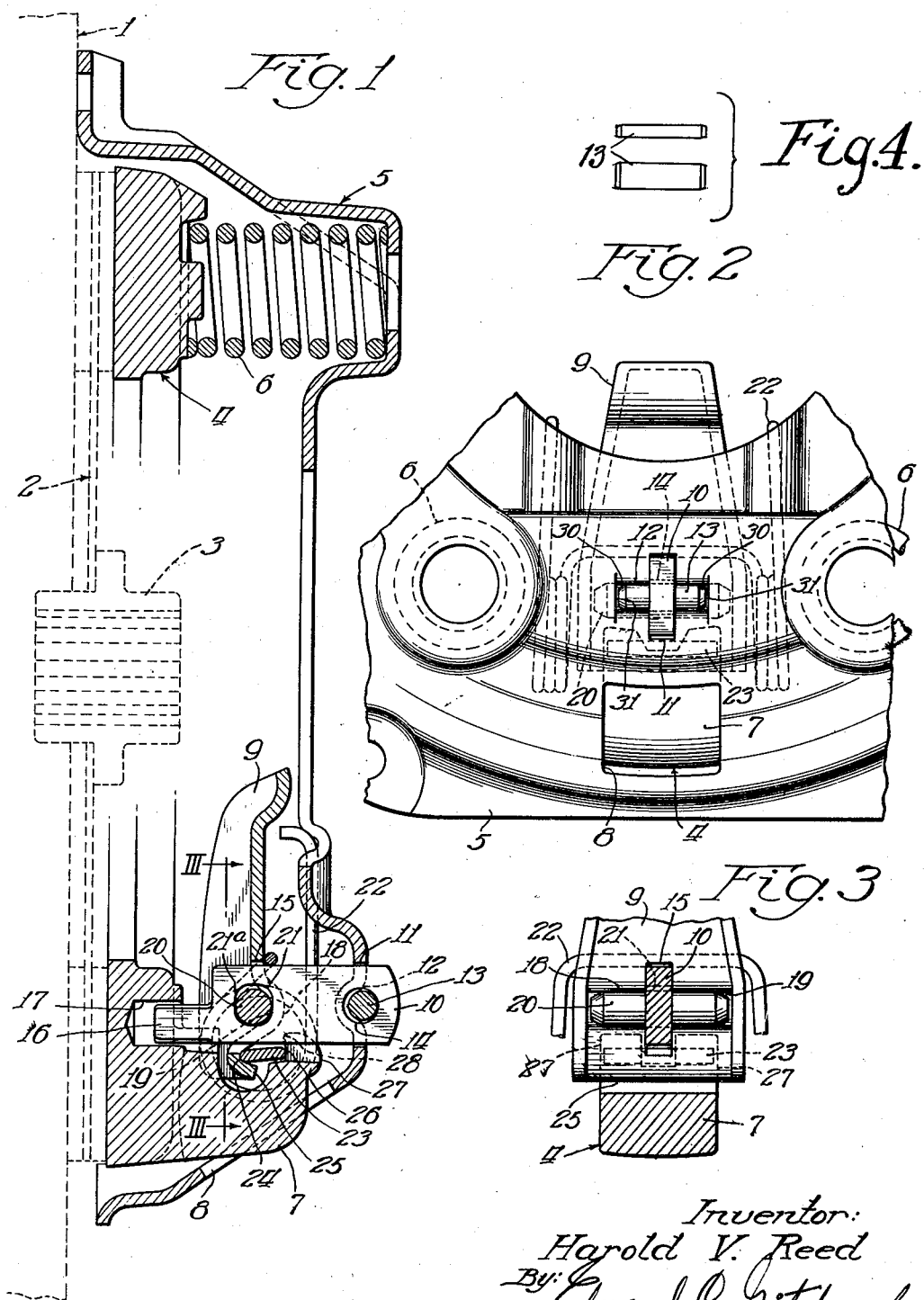

2,164,544

UNITED STATES PATENT OFFICE 2,164,544

FRICTION CLUTCH

Harold V. Reed, Chicago, Ill., assignor to Borg-Warner Corporation, Chicago, Ill., a corporation of Illinois Application November 9, 1936, Serial No. 109,812

10 Claims. (Cl. 192—68)

This invention relates to friction clutches such as are employed in conjunction with the power plants of automotive vehicles, but is not necessarily limited thereto.

It is an object of the invention to improve the action and increase the efficiency of a friction clutch by substantially reducing the friction between the moving parts of the clutch release assembly, thus to decrease the manual effort required to release the clutch.

It is another object of the invention to provide a simplified readily adjustable pressure plate release lever mounting adapted to maintain rigid adjustment of clutch lever alignment.

Further objects and advantages of the invention will appear as the description proceeds.

The invention is illustrated in the accompanying drawing and is hereinafter more fully described.

Fig. 1 is a sectional view showing the invention applied to the parts of a motor vehicle clutch;

Fig. 2 is a fragmentary rear elevational view of the lower portion of Fig. 1;

Fig. 3 is a view taken as indicated by the line III—III in Fig. 1 to show further details of the clutch release lever mechanism; and Fig. 4 shows elevations of interchangeable anchor pins.

Referring now more particularly to Fig. 1, there is shown in dotted outline a driving member such as a flywheel 1 engageable with a clutch plate 2 carried by a hub 3 splined on the driven shaft (not shown). In full lines there appears a pressure plate 4, a cover or back plate 5, adapted to be fastened to the flywheel 1, and intermediate compression springs 6, of which one is illustrated. A driving connection between the plate 4 and cover 5 is obtained by the provision of a plate boss or lug 7 projecting into a slot 8 in the cover. The pressure plate is adapted to be released by levers engageable by the usual thrust sleeve (not shown) operable by the driver, and each is mounted for pivotal movement upon an anchor stud 10. The stud 10 extends rearwardly through an opening 11 in the cover 5, said cover being formed with a depression 12 in which an anchor pin 13 extending through a larger hole 14 in the stud 10, is fitted.

The lever 9 is provided with a longitudinal slot 15 through which the stud 10 projects forwardly, said stud terminating forwardly in a pilot 16 slidably fitted in a hole 17 in the pressure plate 4. The portions of the lever 9 straddling the stud 10 are humped or bulged rearwardly as shown at 18 to provide a recess 19 adapted to receive a retaining and bearing roller 20 fitted in a larger hole 21 in the stud 10 and cooperating to provide a rolling mounting for the lever 9.

By virtue of the fit of the stud 10 in the cover slot 11 and in the pressure plate opening 17, and the relatively rotatively fixed connection at 7, 8, between the cover and plate, it will be observed that the motion of the stud relative to the cover and plate is linear with the exception of a slight pivotal movement thereof about the anchoring element or retainer 13.

The retainer 13 is adapted to be held in tight frictional engagement with the depression 12 of the cover by a spring 22 which preferably is disposed in its entirety in front of the cover and may be of the torsion type, pressing against the inside of the cover 5 on the one hand, and against the juxtaposed side of the lever 9 on the other hand. A thrust element 23 has a substantially knife-edge engagement in the rearwardly opening recess 24 in the outer end 25 of the lever 9 and against the juxtaposed surface 26 provided on the extension 27 from the pressure plate boss 7, said surface being provided with suitable retaining means 28 to retain the thrust element thereagainst.

The spring 22 tends to turn the lever 9 counterclockwise, as seen in Fig. 1. The spring, moreover, tightly presses the lever 9 against the roller 20, so that when the lever turns, the pin is frictionally held and turns therewith and thus is caused to roll along the forward elongated side 21a of the stud opening 21.

The ends 30 of the pin 13 are tapered to facilitate its introduction into the stud opening 14 when the opening is projected rearwardly through the cover slot 11 to the desired extent, against the pressure of the spring 22. The cover 5 at the ends of the depression portions 12 is formed with abutments 31 to prevent displacement of the pin 13. When it is desired to adjust the mounting of the lever 9, as for alignment of the several levers, either by locating its pivot portions 18 nearer or farther from the cover 5, a pin of appropriate diameter as shown in Fig. 4 is substituted for the pin 13. The pin 13 is illustrated as substantially snugly nested in the recess formed by the depression 12, but it will be appreciated that irrespective of the fit, the pressure of the spring 22 will serve to hold the pin securely in its seat.

The stud 10 may be stamped from rod stock and because of its ability to accommodate pins 13 of different sizes, adjustment may be made readily and will not be subject to disturbance, such as vibration may cause in a threaded adjusting mechanism. The cost of the mounting for the levers is substantially reduced and ease of assembly is likewise enhanced due to this simplified construction.

I claim:

1. In a motor vehicle clutch, a clutch cover having an opening therethrough, a pressure plate mounted for movement along the axis of said cover, a stud having one end extending through said cover opening, a clutch release lever, means pivotally mounting said lever on that portion of said stud within said cover, said lever being in force-transmitting relationship with said pressure plate, a member interposed between the outer wall of said cover and a fixed surface on said one end of said stud, thereby to limit movement of the stud inwardly of the cover, said fixed surface forming part of the marginal edge of a space formed in said stud, receiving said member, and of sufficiently larger size than said member so that said member may be replaced with a member of different dimension thus to vary the position of said stud, along its axis, relative to said cover and resilient means interposed between said cover and the lever and exerting a component force upon said lever tending to draw the studs inwardly with relation to the cover and maintaining said fixed surface in continuous bearing engagement with said member.

2. In a motor vehicle clutch, a clutch cover having a rectangular opening therethrough, a pressure plate mounted for movement along the axis of the cover, compression springs interposed between said cover and said pressure plate, a stud of rectangular cross section having one end extending through said cover opening, a clutch release lever for moving said pressure plate against the force of said springs, said lever being pivotally mounted upon that portion of said stud extending within said cover, and a member projecting through an enlarged opening formed in said one end of said stud and engaging with a portion of said cover, thereby to limit movement of said stud inwardly of the cover, said member being replaceable by a member of different dimension thus to vary the position of said stud along its axis relative to the cover.

3. In a motor vehicle clutch, a clutch cover having a rectangular opening therethrough, a pressure plate mounted for movement along the axis of the cover, compression springs interposed between said cover and said pressure plate, a stud of rectangular cross section having one end extending through said cover opening, a clutch release lever for moving said pressure plate against the force of said springs, said lever being pivotally mounted upon that portion of said stud extending within said cover, a member projecting through an enlarged opening formed in said one end of said stud and engaging with a portion of said cover, thereby to limit movement of said stud inwardly of the cover, said member being replaceable by a member of different dimension thus to vary the position of said stud along its axis relative to the cover, and a spring for said lever interposed between said cover and the lever and exerting a component force upon said lever tending to draw the stud inwardly of the cover.

4. In a motor vehicle clutch, the combination defined in claim 2, wherein said member and said opening in said stud are circular in cross section and wherein the cover is formed with a cylindrical walled depression to receive portions of said member.

5. In a motor vehicle clutch, a clutch release lever assembly comprising an elongated stud of rectangular cross section, a lever having an opening therethrough intermediate its length, said opening being rectangular to conform with the cross section of said stud and through which said stud projects, a pivotal connection between said stud and said lever, a clutch cover substantially enclosing said lever, and means for mounting said stud upon said cover and for maintaining said stud against turning movement about its longitudinal axis.

6. The combination defined in claim 5, including spring means interposed between said cover and said lever whereby to provide a component force tending to maintain said stud under tension between said cover and said lever.

7. In a motor vehicle clutch, a clutch cover having an opening therethrough, a pressure plate mounted for movement along the axis of said cover, a stud having one end extended through said cover opening and provided with an opening, a clutch release lever, means pivotally mounting said lever on that portion of said stud within said cover, said lever being in force-transmitting relationship with said pressure plate, and a member interposed between the outer wall of said cover and a portion of the marginal region defining said opening in the stud, said opening being of sufficiently larger diameter than that of the said member so that said member may be replaced with a similar member of different dimensions, thus to vary the position of said stud, along its axis, relative to said cover, and resilient means interposed between said cover and the lever and exerting a component force upon said lever tending to draw the stud inwardly with relation to the cover and maintaining said contacting portion of said marginal region in continuous bearing engagement with said member.

8. In a motor vehicle clutch, a clutch cover having an opening therethrough, a pressure plate mounted for movement along the axis of said cover, a stud having one end extending through said cover opening, a clutch release lever, means pivotally mounting said lever on that portion of said stud within said cover, said lever being in force-transmitting relationship with said pressure plate, and a member interposed between the outer wall of said cover and said one end of said stud, said one end of the stud being formed with a concave surface against which said member is cradled and bottomed, there being provided forwardly of said concave surface a space of such dimensions as to allow said member to be replaced with a similar member of different dimensions thus to vary the position of said stud, along its axis, relative to said cover.

9. In a motor vehicle clutch, a clutch cover having an opening therethrough, a pressure plate mounted for movement along the axis of said cover, a stud having one end extending through said cover opening, a clutch release lever, means pivotally mounting said lever on that portion of said stud within said cover, said lever being in force-transmitting relationship with said pressure plate, and a roller interposed between the outer wall of said cover and a fixed surface on one end of said stud, thereby to limit movement of the stud inwardly of the cover, the outer wall of the cover and the said fixed surface on the stud being fashioned to partially receive and retain said roller in position interposed between them, said roller being replaceable with a similar roller of different dimensions thus to vary the position of said stud, along its axis, relative to said cover.

10. In a motor vehicle clutch, a clutch cover having an opening therethrough, a pressure plate mounted for movement along the axis of said cover, a stud having one end extending through said cover opening, a clutch release lever, means pivotally mounting said lever on that portion of said stud within said cover, said lever being in force-transmitting relationship with said pressure plate, and a roller interposed between the outer wall of said cover and a fixed surface on one end of said stud, thereby to limit movement of the stud inwardly of the cover, the outer wall of the cover and the said fixed surface on the stud being fashioned to conform substantially with the contour of said roller, said roller being replaceable with a similar roller of different dimensions thus to vary the position of said stud, along its axis, relative to said cover.

HAROLD V. REED.